March 9, 1926.  W. SUDEKUM  1,576,376
SPRING HOUSING
Filed Jan. 5, 1925    2 Sheets-Sheet 1
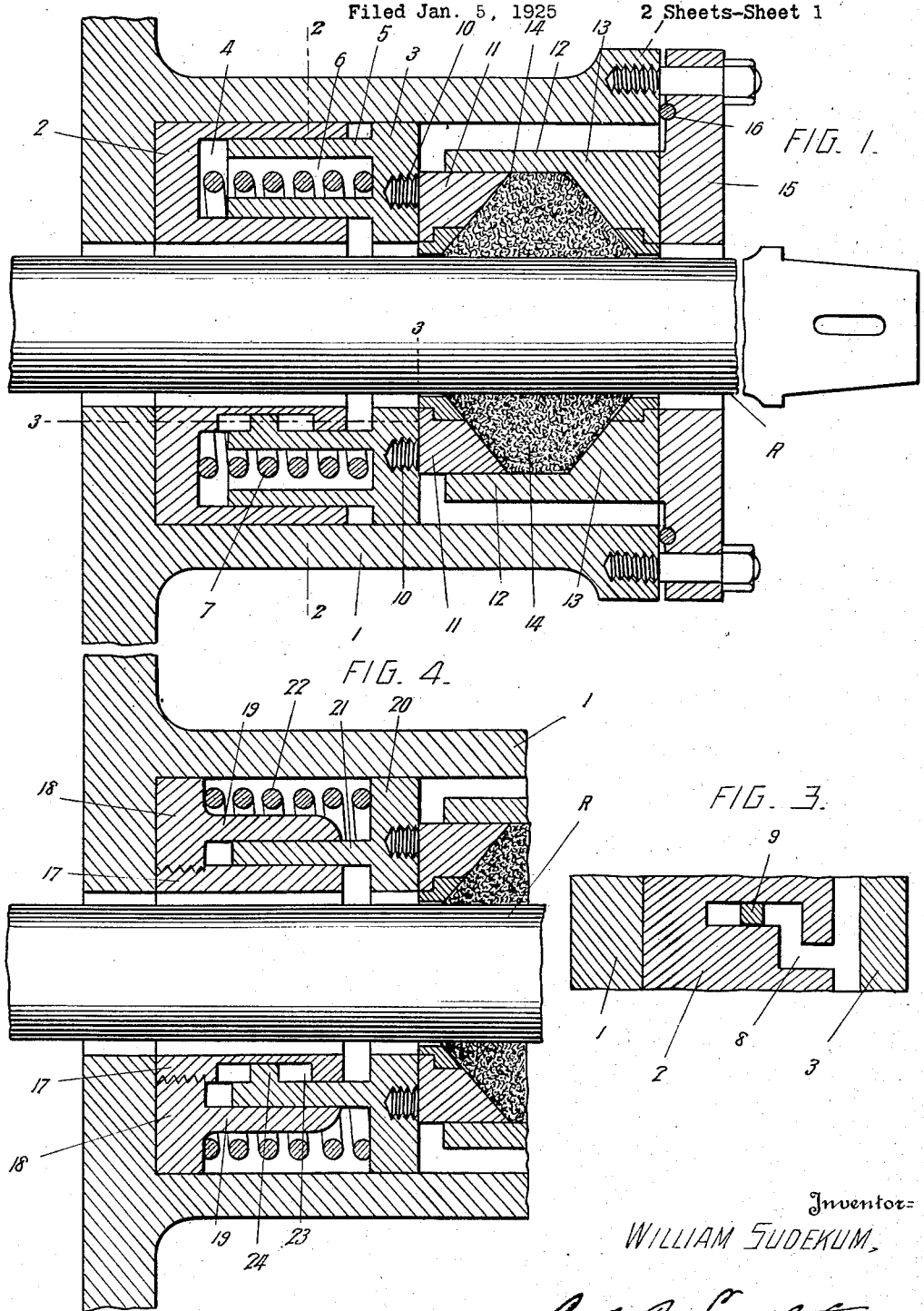
Inventor=
WILLIAM SUDEKUM,
By Ogle R. Singleton
Attorney March 9, 1926.
W. SUDEKUM
1,576,376
SPRING HOUSING
Filed Jan. 5, 1925     2 Sheets-Sheet 2
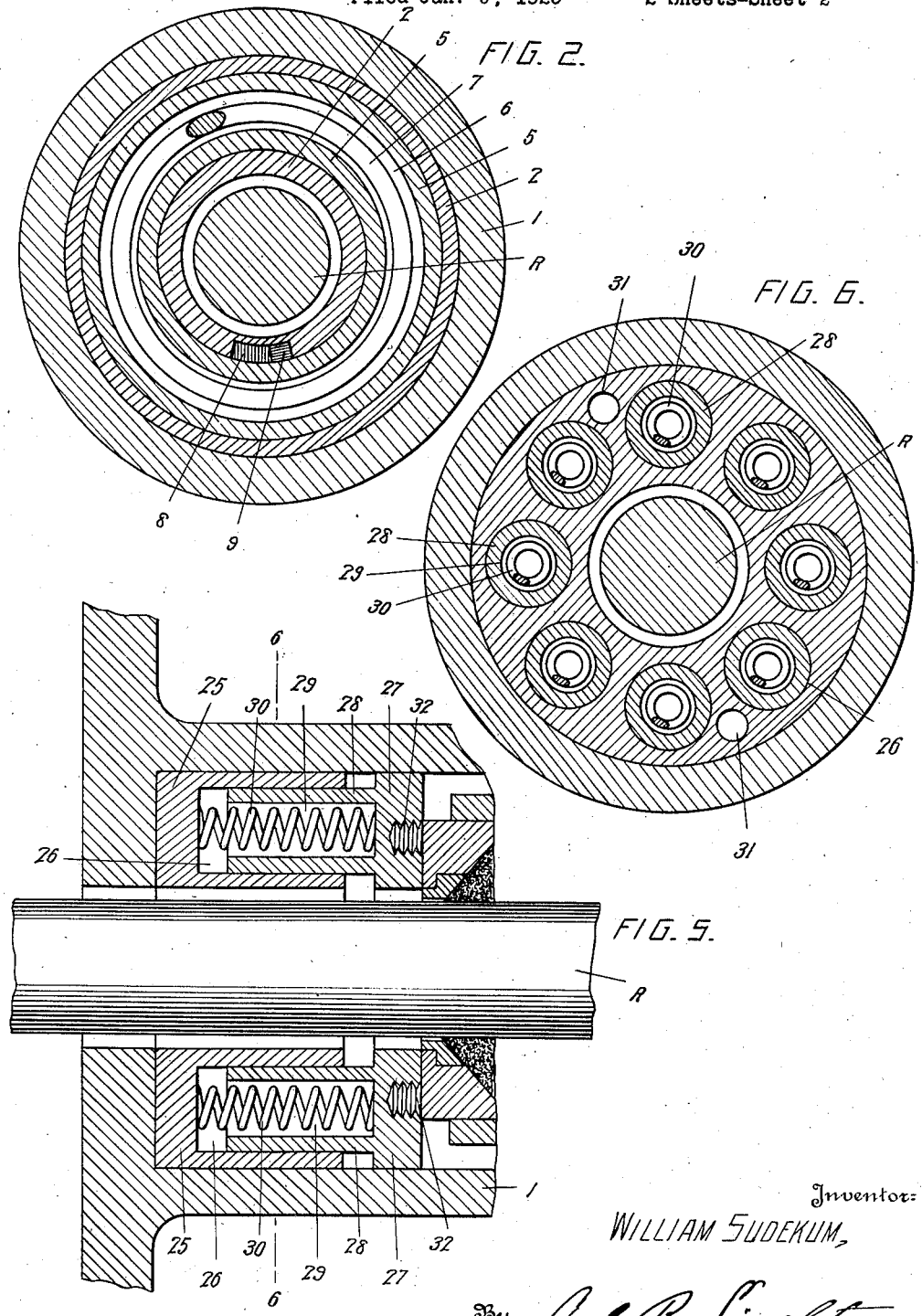
Inventor:
WILLIAM SUDEKUM,
By Ogle R. Singleton
Attorney Patented Mar. 9, 1926.

1,576,376

UNITED STATES PATENT OFFICE.

WILLIAM SUDEKUM, OF NASHVILLE, TENNESSEE.

SPRING HOUSING.

Application filed January 5, 1925. Serial No. 723.

*To all whom it may concern:*

Be it known that I, WILLIAM SUDEKUM, a citizen of the United States, residing at Nashville, in the county of Davidson and State of Tennessee, have invented certain new and useful Improvements in Spring Housings, of which the following is a specification.

My invention consists in a new and useful improvement in spring housings and is designed to provide a housing for the springs used to expand the parts for applying metallic packing to shafts, rods, etc. The particularly novel feature of my device, intended to be used in connection with metallic packing in stuffing boxes of steam cylinders, is the provision of a housing which will effectually protect the springs from the deleterious effect of the steam. Experience has shown that when the springs used to expand the parts to compress the metallic packing on pistons of steam cylinders are exposed to super-heated steam from the cylinder which often attains a temperature of over 700° F., the effect of this super-heated steam is to injure the temper of the springs and so destroy their usefulness. I have devised a housing which will completely enclose the springs so as to prevent the steam from attacking the springs, and thereby preserve their temper and efficiency.

I have illustrated in the drawings filed herewith, and have hereinafter described the details of construction of several specific embodiments of my invention, but it is to be distinctly understood that I do not consider my invention limited to said specific embodiments but refer for its scope to the claims appended hereto.

In the drawings:

Fig. 1 is a longitudinal vertical section of a stuffing box equipped with one form of my improved housing.

Fig. 2 is a transverse section on the line 2—2 of Fig. 1.

Fig. 3 is a horizontal section on the line 3—3 of Fig. 1.

Fig. 4 is a view similar to Fig. 1, illustrating a modified form of my device.

Fig. 5 is another similar view, illustrating another modified form of my device.

Fig. 6 is a section on the line 6—6 of Fig. 5.

In the drawings, the numeral 1 indicates the stuffing box containing my device. The spring housing consists of two co-acting parts, the female member 2 and the male member 3 which are rings encircling and spaced from the piston rod R and fitting into the box 1, the member 2 being seated against the inner end of the box 1. The female member 2 is provided with an annular groove 4 into which is received the annular extension 5 from the male member 3 provided with the annular spring receiving chamber 6. The expansion spring 7, received in the groove 4 and chamber 6, is positioned to exert its expansive force to force apart the members 2 and 3.

In order to secure an inter-locking means between the members 2 and 3, I have provided a sinuous slot 8 in the member 2 and co-acting pin 9 on the member 3, to effect a bayonet-latch connection between the members. I also provide draw-holes 10 in the outer face of the member 3 to provide means for withdrawing the housing from the box 1, if and when desired.

Adjacent the member 3, I provide a packing retaining ring 11 enclosed by a flange 12 on the complementary packing retaining ring 13, the packing 14 being compressed by the action of the spring 7 between the ring 11 and the ring 13 which is held in the box 1 by a suitable gland 15 provided with a gasket 16 and bolted to the box 1 in the usual way.

In Fig. 4, I have illustrated a modified form of housing consisting of a female member comprising a ring 17, encircling and spaced from the piston rod R, on which is threaded an outer ring 18, seated against the inner end of the box 1, and having the annular projection 19, spaced from the ring 17 and the inner face of the box 1, and the male member consisting of the ring 20 encircling and spaced from the piston rod R and having the annular projection 21 received in the space between the ring 17 and the projection 19. The expansion spring 22 is received in the space between the projection 19 and the inner surface of the box 1 and is positioned to exert its expansive force to force apart the rings 18 and 20. In this form of housing, I provide a sinuous slot 23 in the outer face of the projection 17 and a co-acting pin 24 on the projection 21 to afford a bayonet-latch inter-locking means between the members of the housing.

In Fig. 5, I have illustrated another modified form of housing and one which is designed to house a plurality of springs arranged circumferentially in the stuffing box 1. In this form, the housing consists of the female member 25 comprising a ring encircling and spaced from the piston rod R and fitted into the box 1, seated against the inner end thereof and provided with a series of circumferentially disposed sockets 26, and the male member 27 comprising a ring encircling and spaced from the piston rod R, fitted into the box 1 and provided with a series of tubular projections 28 received in the sockets 26 of the female member 25 and provided with sockets 29. The expansion springs 30 are received in the sockets 26 and 29 and are disposed so as to exert their expansive force to force apart the members 25 and 27. I provide suitable draw-holes 31 in the outer face of the member 25 and draw-holes 32 in the outer face of the member 27, for the purpose of supplying means by which the members may be removed from the box 1, if and when desired.

Having described my invention, what I claim is:

1. In a spring housing for a piston rod packing spring, the combination of a ring provided with an annular recess and longitudinal sinuous slot; a second ring provided with an annular extension slidable in said recess, and pin received in said slot; and an annular helical spring interposed between said rings.

2. In a spring housing for a piston rod packing spring, the combination of a ring; a second ring threaded on said first ring and provided with an annular projection spaced from said first ring; a third ring provided with an annular projection slidable between the first ring and the projection on the second ring; and an annular helical spring interposed between the second and third rings.

In testimony whereof I affix my signature.

WILLIAM SUDEKUM.